(12) United States Patent
Yang et al.

(10) Patent No.: US 10,399,295 B2
(45) Date of Patent: Sep. 3, 2019

(54) PASSIVE ELECTRICAL ARTICLE

(71) Applicant: 3M INNOVATIVE PROPERTIES COMPANY, St. Paul, MN (US)

(72) Inventors: Rui Yang, Austin, TX (US); Guoping Mao, Woodbury, MN (US); Dipankar Ghosh, Oakdale, MN (US); Ji-Hwa Lee, Gyeonggi-do (KR); Seungbae Min, Kyonggi-do (KR); Justine A. Mooney, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 371 days.

(21) Appl. No.: 15/207,719

(22) Filed: Jul. 12, 2016

(65) Prior Publication Data

US 2016/0318279 A1    Nov. 3, 2016

Related U.S. Application Data

(62) Division of application No. 12/771,365, filed on Apr. 30, 2010, now abandoned.

(60) Provisional application No. 61/174,667, filed on May 1, 2009, provisional application No. 61/295,411, filed on Jan. 15, 2010.

(51) Int. Cl.
| | |
|---|---|
| *B32B 37/14* | (2006.01) |
| *B32B 5/02* | (2006.01) |
| *H01C 7/00* | (2006.01) |
| *H01G 4/18* | (2006.01) |
| *B32B 5/14* | (2006.01) |
| *B32B 9/00* | (2006.01) |
| *B32B 9/04* | (2006.01) |
| *B32B 15/14* | (2006.01) |
| *B32B 15/20* | (2006.01) |
| *B32B 27/12* | (2006.01) |
| *B32B 27/18* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/42* | (2006.01) |
| *B32B 38/00* | (2006.01) |

(52) U.S. Cl.
CPC ............. *B32B 5/022* (2013.01); *B32B 5/147* (2013.01); *B32B 9/007* (2013.01); *B32B 9/047* (2013.01); *B32B 15/14* (2013.01); *B32B 15/20* (2013.01); *B32B 27/12* (2013.01); *B32B 27/18* (2013.01); *B32B 27/281* (2013.01); *B32B 27/285* (2013.01); *B32B 27/308* (2013.01); *B32B 27/322* (2013.01); *B32B 27/34* (2013.01); *B32B 27/36* (2013.01); *B32B 27/42* (2013.01); *H01C 7/00* (2013.01); *H01G 4/18* (2013.01); *B32B 38/0036* (2013.01); *B32B 2255/00* (2013.01); *B32B 2255/02* (2013.01); *B32B 2255/06* (2013.01); *B32B 2255/10* (2013.01); *B32B 2255/205* (2013.01); *B32B 2255/24* (2013.01); *B32B 2255/26* (2013.01); *B32B 2262/02* (2013.01); *B32B 2262/023* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2264/105* (2013.01); *B32B 2270/00* (2013.01); *B32B 2305/20* (2013.01); *B32B 2305/30* (2013.01); *B32B 2307/202* (2013.01); *B32B 2307/204* (2013.01); *B32B 2307/308* (2013.01); *B32B 2307/546* (2013.01); *B32B 2457/00* (2013.01); *B32B 2457/08* (2013.01); *B32B 2457/16* (2013.01); *Y10T 442/20* (2015.04); *Y10T 442/2008* (2015.04); *Y10T 442/2861* (2015.04); *Y10T 442/2885* (2015.04); *Y10T 442/291* (2015.04); *Y10T 442/60* (2015.04)

(58) Field of Classification Search
CPC ................................ B32B 37/00; B32B 37/14
See application file for complete search history.

(56) References Cited

U.S. PATENT DOCUMENTS

| | | | | |
|---|---|---|---|---|
| 3,878,316 A | * | 4/1975 | Groff | .................. H05K 1/0366 174/258 |
| 4,410,586 A | * | 10/1983 | Ladizesky | ............... B29C 59/14 156/181 |
| 4,637,851 A | * | 1/1987 | Ueno | ...................... B29C 59/14 156/272.6 |
| 5,085,928 A | | 2/1992 | Krueger | |
| 5,705,534 A | | 1/1998 | D'Agostino | |
| 6,229,096 B1 | | 5/2001 | Gaku et al. | |
| 6,274,224 B1 | | 11/2001 | O'Bryan et al. | |
| 6,323,436 B1 | | 11/2001 | O'Bryan et al. | |

(Continued)

FOREIGN PATENT DOCUMENTS

| | | |
|---|---|---|
| DE | 10313399 | 12/2003 |
| JP | H06-196357 | 7/1994 |

(Continued)

OTHER PUBLICATIONS

Grafe, et al., "Polymeric Nanofibers and Nanofiber Webs: A New Class of Nonwovens", presented at INTC 2002: International Nonwovens Technical Conference, Atlanta, GA, Sep. 24-26, 2002.

(Continued)

*Primary Examiner* — Andrew T Piziali
(74) *Attorney, Agent, or Firm* — Clifton F. Richardson

(57) ABSTRACT

A passive electrical article including a dielectric layer having a nonwoven material.

14 Claims, No Drawings

(56) References Cited

U.S. PATENT DOCUMENTS

| | | | |
|---|---|---|---|
| 6,399,924 B1 | 6/2002 | Cai | |
| 6,473,950 B1 | 11/2002 | Kumakawa | |
| 6,577,492 B2 | 6/2003 | O'Bryan et al. | |
| 6,608,760 B2 | 8/2003 | Hartman | |
| 6,657,849 B1 | 12/2003 | Andresakis et al. | |
| 6,730,439 B2 | 5/2004 | Kamei et al. | |
| 6,847,527 B2 | 1/2005 | Sylvester et al. | |
| 6,890,635 B2 | 5/2005 | Lin et al. | |
| 7,348,045 B2 * | 3/2008 | Yang | H05K 1/028 174/254 |
| 7,351,915 B2 | 4/2008 | Ahn et al. | |
| 7,524,388 B2 | 4/2009 | Roseen, Jr. et al. | |
| 7,990,681 B2 | 8/2011 | Nagara | |
| 2004/0106343 A1 | 6/2004 | Senecal et al. | |
| 2006/0257622 A1 | 11/2006 | Shin et al. | |
| 2006/0286696 A1 | 12/2006 | Peiffer et al. | |
| 2008/0070463 A1 | 3/2008 | Arora et al. | |

FOREIGN PATENT DOCUMENTS

| | | |
|---|---|---|
| JP | H01-205411 A | 7/2001 |
| JP | 2002-009416 | 1/2002 |
| JP | 2002-160317 A2 | 6/2002 |
| JP | 2003-166191 | 6/2003 |
| JP | 2003-188483 A | 7/2003 |
| JP | 2004-174730 | 6/2004 |
| JP | 2004-241647 A | 8/2004 |
| JP | 2004345355 | 12/2004 |
| JP | 2005-175265 A | 6/2005 |
| JP | 2005187800 | 7/2005 |
| JP | 2005262513 | 9/2005 |
| JP | 2006-107770 | 4/2006 |
| JP | 2006-190627 | 7/2006 |
| JP | 2006316171 | 11/2006 |
| JP | 2007-110044 A | 4/2007 |
| JP | 2007-118528 A | 5/2007 |
| JP | 2008-050383 | 3/2008 |
| JP | 2009-076350 | 4/2009 |
| KR | 20040078921 | 9/2004 |
| WO | WO 94/02310 | 2/1994 |
| WO | WO 2007132708 | 11/2007 |

OTHER PUBLICATIONS

Yang et al., "Passive Electrical Article", U.S. Appl. No. 12/603,357, filed Oct. 21, 2009.

International Search Report for International Application No. PCT/US2010/033167, dated Dec. 8, 2010.

Supplementary European Search Report for EP 10770422 dated Jul. 25, 2013, 2 pp.

Polyclad Technical Data Sheet, downloaded Nov. 13, 2013.

Definition of "cross-link" Merriam-Webster Dictionary, www.merriam-webster.com/dictionary/cross-link, no date.

Definition of "Liquid crystal polymer" Wikipedia, https://en.wikipedia.org/wiki/Liquid_crystal_polymer, Sep. 21, 2015.

Definition of "Thermosetting polymer" Wikipedia, https://en.wikipedia.org/wiki/Thermosetting_polymer, Mar. 21, 2016.

Modern Armour From Chemistry, www.scienceshorts.com/Ssw/050604.htm, no date.

Definition "Aramid" (Aromatic Polyamide), Wikipedia, https://en.wikipedia.org/wiki/Aramid, Mar. 11, 2016.

* cited by examiner

# PASSIVE ELECTRICAL ARTICLE

CROSS REFERENCE TO RELATED APPLICATIONS

The present application is a divisional of U.S. patent application Ser. No. 12/771365 which claims priority to U.S. Provisional Patent Application 61/174,667, filed May 1, 2009 and 61/295,411, filed Jan. 15, 2010.

TECHNICAL FIELD

This invention relates to passive electrical articles. In particular it relates to the dielectric layer in passive electrical articles such as capacitors and resistors.

BACKGROUND

Electrical articles such as the capacitors and resistors described in U.S. Pat. Nos. 6,274,224 and 6,577,492 typically include a polymeric insulating or electrically conducting layer between first and second self supporting substrates.

The dielectric material of the insulating layer is typically a metal oxide, such as tantalum oxide, or a high dielectric constant ceramic, such as barium titanate. The dielectric material is typically dispersed in a matrix of some thermally and mechanically stable polymer, such as an epoxy. The electrical articles can be used as a layer in printed wiring boards and multichip modules.

SUMMARY

One embodiment of the present invention features a passive electrical article having a dielectric layer comprising a resin and a nonwoven material.

Another embodiment of the present invention features a method of making an electrical article comprising providing two conductive substrates, coating a resin on a surface of each conductive substrate, providing a nonwoven material between the resin-coated surfaces of the conductive substrates, and laminating the resin-coated conductive substrates and the nonwoven material together.

Another embodiment of the present invention features a method of making an electrical article comprising coating a resin layer on a surface of a first conductive substrate, forming a nonwoven material on a surface of a second conductive substrate, and laminating the conductive substrate together with the resin layer and nonwoven material facing each other.

Another embodiment of the present invention features a method of making an electrical article comprising forming a nonwoven material on a first surface of one or both of a first and second conductive substrate; coating a resin layer on the first surfaces of both conductive substrates, and laminating the conductive substrates together with the resin-coated first surfaces facing each other.

An advantage of at least one embodiment of the present invention is that it provides a strong, flexible dielectric layer suitable for use in a copper-clad laminate capacitor structure that is subjected to a double-sided copper patterning etch process. Being able to etch both copper layers at the same time, rather than one at a time enables a process cost reduction.

In this application, the term "self-supporting" refers to a film, web, material, layer, or substrate having sufficient structural integrity such that the it is capable of being handled an/or subjected to at least some processed without a separate supporting layer.

Other features and advantages of the invention will be apparent from the following drawings, detailed description, and claims.

DETAILED DESCRIPTION

In one aspect, the invention is a dielectric layer that may be used in a passive electrical article, such as a capacitor, resistor, or inductor. The passive electrical articles are preferably suitable for embedding in a printed circuit board. The electrical articles generally include a first self-supporting conductive substrate having two opposing major surfaces and a second self-supporting conductive substrate having two opposing major surfaces. A dielectric layer between the first and second substrate provides an electrical insulating function and adheres the two substrates together.

The substrates of the electrical article of the invention may include a single layer, or a plurality of layers arranged in a laminate structure. The first and second substrates may be made of graphite; composites such as silver particles in a polymer matrix; metal such as Copper, Aluminum, Nickel, Chromium, Zinc, Tin, Gold, Silver, Palladium; and alloys or laminates thereof. A substrate may be made by coating a layer of metal, such as copper or aluminum, onto a removable carrier layer. For example, a copper layer may be coated onto a removable polyester carrier. The first and second substrates may be the same or different. The electrical article of the invention may include multiple insulating and conductive layers.

A substrate in accordance with the electrical articles of the invention is preferably self-supporting. It is preferable that a substrate is flexible; however, rigid substrates may also be used.

Typically, the major surface of the first substrate in contact with the dielectric layer and the major surface of the second substrate in contact with the dielectric layer are electrically conductive. Surface treatment, which adds material to these major surfaces by, for example, oxidation or reaction with a coupling agent, may be used to promote adhesion. Alternatively, a separate coating step may be performed to apply an adhesion promoting primer, such as 5-aminobenzotriazole. Treatment of the substrate surface with 5-aminobenzotriazole may be particularly relevant for copper foils not having a chromate anti-tarnish surface treatment. The resulting material on the major surface of the substrate itself may not necessarily be conductive, but a suitable electrical article can be formed provided the substrates themselves are conductive.

Typically, a substrate has a thickness ranging from 0.5 to 3 mils (approximately 10 to 80 μm), more typically 0.5 to 1.5 mils (approximately 10 to 38 μm).

When the substrate is a metal, the metal typically has an anneal temperature which is at or below the temperature for curing the dielectric layer, or the metal is annealed before the dielectric layer is coated. A preferred substrate is copper. The copper may be any suitable type such as, but not limited to, rolled annealed, electrodeposited, and reverse electrodeposited. Exemplary copper includes copper foil available from Carl Schlenk, AG, Nurnberg, Germany and Oak Mitsui, Camden, S.C.

The dielectric layer of the electrical article, which may be made of one or more layers, includes a polymer. Any polymer may be used that can withstand the temperatures encountered in a typical solder reflow operation, for example, about 180 to about 290° C. Suitable polymeric materials for the dielectric layer include Acrylates, Allyated Polyphenylene Ether (APPE), Benzocyclobutene (BCB), Bismaleimide Triazine (BT), Cyanate Ester, Epoxy, Polyamide, Polyester, Polyimide, Polyphenylene Oxide (PPO), Polytetrafluoroethylene (PTFE), and combinations thereof.

Suitable epoxy resin compositions may be made from thermally curable epoxy resins. The term epoxy resin composition will typically be used to refer to an uncured composition. An exemplary epoxy resin composition includes one or more aromatic polyepoxides and one or more 9,9-bis(aminophenyl)fluorene curing agents. Suitable aromatic polyepoxides include poly(glycidyl ether)s of polyhydric phenols and epoxy resins available from Shell Chemical Company, Houston, Tex., under the trade designations EPON 1001F and EPON 1050. Other suitable resins include blends of a diglycidylether of bisphenol A and a novolac epoxy, for example, 75 to 90% by weight EPON 1001F and 25 to 10% by weight EPON 1050F based on the total weight of the resin. Suitable curing agents for the epoxy resin compositions include, but are not limited to, di(4-aminophenyl)sulfone and 9,9-bis(aminophenyl)fluorene as described in U.S. Pat. No. 4,684,678.

The polymer of the dielectric layer of the present invention is typically loaded with particles having high dielectric constants to increase the dielectric constant of the dielectric layer. Suitable particles include Barium Titanate, Barium Strontium Titanate, Titanium Oxide, Barium Strontium Titanate (BST), Calcium Copper Titanate, Lead Zirconium Titanate, Lead Lanthanium Zirconate Titanate, Lead Magnesium Titanate, Lead Magnesium Niobate-Lead Titanate (Pb $(Mg_{1/3}Nb_{2/3})O_3$.—$PbTiO_3$), Iron Titanium Tantalate ($FeTiTaO_6$), Bismuth Ferrite ($BiAlO_3$), Bismuth Ferrite ($BiFeO_3$), NiO co-doped with Li and Ti, $La_{1.5}Sr_{0.5}NiO_4$, $Nd_{1.5}Sr_{0.5}NiO_4$, and mixtures thereof.

The particles may be any shape and may be regularly or irregularly shaped. Exemplary shapes include spheres, platelets, cubes, needles, oblate, spheroids, pyramids, prisms, flakes, rods, plates, fibers, chips, whiskers, and mixtures thereof. A suitable particle size, e.g., diameter, may have a lower range of about 100 nm to about 5 nm and an upper range of about 2 micrometer (μm) to about 11 μm. Typically, the particles have a size allowing at least two to three particles to be stacked vertically within the electrically insulating layer thickness. It has been found that dielectric layers with spherical dielectric particles having a small diameter, e.g., about 100 nm, have better strength and flexibility than dielectric layers with spherical particles having an average diameter of about 0.5 μm to about 1 μm and a distribution range of about 0.1 to about 2 μm.

A suitable coatable resin composition used to form the dielectric layer is typically made from a mixture of epoxy resin, a dispersant, a curing agent, the dielectric particles, and other optional ingredients. Typically, the resulting substantially uniform mixture is subsequently coated on a suitable substrate, then heated for a time and at temperature sufficient to remove volatile components.

The dielectric constant of the dielectric material of at least some embodiments of the present invention is greater than about 4, preferably greater than about 11, and more preferably greater than about 15. To achieve a dielectric material having a high dielectric constant, the loading levels of the dielectric particles may be very high, which can make the dielectric material very brittle. If it is brittle, it cannot endure being processed as a free-standing layer. For example, if both substrates are to be pattern etched, the brittleness of the dielectric layer requires that one substrate is etched, a supporting layer is applied to the etched substrate, then the other substrate is etched. In this manner, the dielectric layer is always supported on at least one side.

The present invention provides a more flexible and robust dielectric layer, which allows both substrates to be etched at the same time. This enables a faster and more efficient manufacturing process. The present invention provides these benefits while also providing a dielectric constant and capacitance on par with existing dielectric materials such as those used to form capacitors. The improved properties of the dielectric material of the present invention are achieved by using a nonwoven material in the dielectric layer. Although the nonwoven material itself may have a low dielectric constant, because it has openings that allow the polymer material of the dielectric layer to form a continuous path from one substrate to the other, it does not have the disadvantages of a solid film, which would prevent the polymer material from forming a continuous path from one substrate to the other.

Suitable nonwoven materials can be made of any material that can be formed into a nonwoven material. Such materials include, but are not limited to liquid crystal polymer (LCP), nylon, polyester, polystyrene, polyacrylonitrile, polypropylene, polyvinylidene fluoride (PVDF), and hybrid materials such as poly(ether sulfone)-polyvinylidene fluoride (PES-PVDF), polyetherimide-polyvinylidene fluoride (PEI-PVDF), polyacrylonitrile-polyvinylidene fluoride (PAN-PVDF), ethylene chlorotrifluoroethylene (ECTFE), and combinations thereof. The nonwoven materials may be of any suitable form such as, but not limited to, meltblown nonwovens, spunbond nonwovens, and electrospun nonwovens. Various additives may be added to the precursor material for the nonwoven materials to influence certain properties of the nonwoven material such as dielectric properties, mechanical properties, chemical properties, and thermal properties.

In some embodiments, the precursor material used to make the nonwoven materials may contain a crosslinking agent so that the fibers in the nonwoven materials can be crosslinked after the nonwoven material is formed. Suitable crosslinking agents can be thermal, e-beam, and UV crosslinking agents and include, but are not limited to, triallycyanurate and triallyisocyanurate. The crosslinking agent may be added in any suitable amount, typically about 2 to about 3 wt %. Crosslinking the nonwoven material can improve properties such as thermal stability, solvent resistance, and durability.

The fibers in the nonwoven material may be loaded with dielectric particles, i.e., dielectric particles are embedded in the fibers of the nonwoven material, to increase the dielectric constant of the dielectric layer. Suitable dielectric particles include those previously described, e.g., Barium Titanate, Barium Strontium Titanate, Titanium Oxide, Barium Strontium Titanate (BST), Calcium Copper Titanate, Lead Zirconium Titanate, Lead Lanthanium Zirconate Titanate, Lead Magnesium Titanate, and mixtures thereof. The dielectric particles will be loaded with an amount of dielectric particles suitable to provide the desired properties for the dielectric layer. In at least one embodiment, the particles are loaded in an amount of about 10 to about 15 wt % of the precursor material used to form the nonwoven material.

Other materials may be added to the precursor material used to form the nonwoven material to change other properties. For example, silicon dioxide may be added to change the mechanical properties of the nonwoven material.

For various embodiments of the present invention, the fibers in the nonwoven material may be arranged randomly or uniformly. If the passive electrical articles being made will be divided into small pieces for their ultimate use, e.g., in a small microphone or other miniaturized devices, a more uniform fiber pattern will provide more consistent properties, such as capacitance, from piece to piece.

In a capacitor, the thinner the dielectric layer, the higher the capacitance. Therefore, it is preferable that the nonwoven material be very thin, e.g., in some embodiments below 20 micrometers, in some embodiments below 10 micrometers, and in some embodiments about or below 0.5 micrometers. Most nonwoven materials, when made, are self-supporting and have a thickness of about 1 micrometer or more.

To provide a thinner nonwoven material, the nonwoven material may be etched. For example, an LCP nonwoven material may be etched in a similar manner as an LCP film by using a highly alkaline etching solution such as that described in U.S. Pat. No. 7,348,045. The highly alkaline etching solution, comprises an alkali metal salt and optionally a solubilizer. A solution of an alkali metal salt alone may be used as an etching solution for polyimide but has a low etching rate when etching materials such as LCP. However, when a solubilizer is combined with the alkali metal salt etchant, it can be used to effectively etch polyimide copolymers having carboxylic ester units in the polymeric backbone and LCPs.

Water soluble salts suitable for use in the etching solution include, for example, potassium hydroxide (KOH), sodium hydroxide (NaOH), substituted ammonium hydroxides, such as tetramethylammonium hydroxide and ammonium hydroxide or mixtures thereof. Useful alkaline etching solutions include aqueous solutions of alkali metal salts including alkali metal hydroxides, particularly potassium hydroxide, and their mixtures with amines, as described in U.S. Pat. Nos. 6,611,046 B 1 and 6,403,211 B 1. Useful concentrations of the etching solutions vary depending upon the thickness of the film to be etched. Typical useful concentrations of a suitable salt range for etching LCP have a lower range of about 30 wt. % to 40 wt. % and an upper range of about 50 wt. % to about 55 wt. %. Typical useful concentrations of a suitable solubilizer have a lower range of about 10 wt. % to about 15 wt. % and an upper range of about 30 wt. % to about 35 wt. %. The use of KOH with a solubilizer is preferred for producing a highly alkaline solution because KOH-containing etching solutions have higher etching rates. The etching solution is generally at a temperature of from about 50° C. (122° F.) to about 120° C. (248° F.) preferably from about 70° C. (160° F.) to about 95° C. (200° F.) during etching.

Typically the solubilizer in the etching solution is an amine compound, preferably an alkanolamine. Solubilizers for etching solutions according to the present invention may be selected from the group consisting of amines, including ethylene diamine, propylene diamine, ethylamine, methylethylamine, and alkanolamines such as ethanolamine, diethanolamine, propanolamine, and the like. The etching solution, including the amine solubilizer, works most effectively within the above-referenced percentage ranges. This suggests that there may be a dual mechanism at work for etching liquid crystal polymers, i.e., the amine acts as a solubilizer for the liquid crystal polymers most effectively within a limited range of concentrations of alkali metal salt in aqueous solution.

Alternatively, the nonwoven material can be formed on a supporting backing layer, such as a polyester layer. When the nonwoven fibers are formed into a web or layer directly on the supporting backing layer, they can be made thinner than are required for a self-supporting nonwoven material. In one embodiment, nonwoven materials are made thin by using nanofibers to form the nonwoven material, i.e., the fibers in the nonwoven material have diameters in the nanometer range, i.e., less that one micrometer, and typically from about 20 to about 500 nanometers. The nanofiber nonwoven materials can be made using the same materials that are used to form other nonwoven materials. In at least one embodiment, because they are so small, using the nanofibers allows for a thin nonwoven material having multiple layers of fiber in contrast to a nonwoven material of the same thickness having larger diameter fibers. In some embodiments, the nanofibers can provide a more uniform and/or denser matrix of fibers. Nanofibers and nanofiber nonwoven materials may be made by any suitable method, typically electrospinning. Nanofibers, nanofiber webs, i.e., materials, and electrospinning are described in more detail in "Polymeric Nanofibers and Nanofiber Webs: A New Class of Nonwovens," Timothy Grafe, et al., presented at INTC 2002: International Nonwovens Technical Conference (Joint INDA-TAPPI Conference), Atlanta, Ga., Sep. 24-26, 2002.

A method for manufacturing an electrical article of the invention includes providing first and second substrates, each having two opposing major surfaces. A polymer composition, such as an epoxy resin composition, may then be coated onto a first major surface of each of the substrates. The two substrates may then be laminated together with their polymer-coated sides facing each other and a nonwoven layer between the two first major surfaces. As the layers are laminated together, the polymer fills the voids in the nonwoven material so that the polymer and nonwoven material essentially form a single layer. The amount of polymer coated on the first major surfaces and the thickness of the nonwoven material may be controlled such that the nonwoven material contacts, or does not contact, the first major surface of one or both of the substrates. The resulting laminate may then heated for a time and a temperature sufficient to cure the polymer composition such as an epoxy resin. The major surfaces of the substrates are preferably substantially free of debris or chemisorbed or adsorbed materials to maximize adhesion with the electrically insulating layer. Suitable substrate cleaning methods known in the art may be used.

The cleaned substrate may be coated with the polymer composition using any suitable method, for example, a gravure coater. The polymer composition is then dried to remove residual solvent. The dry thickness of the coated polymer composition depends on the percent solids in the composition, the relative speeds of the gravure roll and the coating substrate, and on the cell volume of the gravure used. Typically, to achieve a dry thickness in the range of about 3 to about 10 μm, the percent solids in the polymer resin composition are about 20 to 75% by weight. For polymer compositions such as an epoxy resin composition, the coating is typically dried to a substantially tack-free state in the oven of the coater, typically at a temperature of less than about 100° C. More typically, the coating is dried in stages starting with a temperature of about 30° C. and ending with a temperature of about 100° C., and then wound onto a roll. Higher final drying temperatures, e.g., up to about 200° C. can be used, but are not required.

Lamination is preferably carried out using two of the coated substrates described above. One or both of the coated substrates may go through an oven or over a heated roller before reaching the laminator, for example, at a temperature ranging from about 125 to about 175° C. for less than 30 seconds, and more typically at a temperature about 125 to about 160°. In particular, adhesion of the substrate may be improved by heat treating the coating before lamination. The time for heat treatment is typically short, for example, less than about 10 minutes, particularly at higher temperatures.

In at least one embodiment of the present invention, the polymer composition is applied directly to the nonwoven material and the nonwoven material is subsequently laminated between two substrates.

To make an electrical article of the present invention, a batch process or roll-to-roll process may be used. In a suitable roll-to-roll process, the coated substrates may be laminated, polymer layer to polymer layer with the nonwoven material fed between the two coated substrates, using a laminator with two nip rollers heated to a temperature ranging from about 120 to about 200° C., typically about 135° C. Suitable air pressure is supplied to the laminator rolls, typically at a pressure ranging from about 5 to about 40 psi (34 to 280 kPa), typically about 15 psi (100 kPa). The roller speed can be set at any suitable value and typically ranges from about 12 to about 36 inches/minute (0.5 to 1.5 cm/second), more typically about 15 inches/minute (0.64 cm/second). If the nonwoven layer is self-supporting, it can be fed between the coated substrates from a roll. If it is not self-supporting it can be fed between the coated substrates as a supporting backing layer is peeled away from the nonwoven material. The time, temperature, and pressure used during the lamination process can be adjusted to ensure that the polymer material fills the voids in the nonwoven material during of the process. In some embodiments, it may be suitable to use a vacuum-pressure impregnation (VPI) method such as that described in U.S. Pat. No. 7,524,388 to impregnate the nonwoven material with the polymer dielectric material. The resulting laminated material can be cut into sheets of the desired length or wound onto a suitable core.

In an alternative roll-to-roll process, the nonwoven material may be formed on, or supported by, a sheet or film then coated with a polymer material, such as epoxy. The polymer-coated nonwoven material may then be fed between the substrate layers, generally as described above. In this case, the substrate layers may, or may not be, separately coated with polymer.

In another alternative roll-to-roll process, the nonwoven material may be formed directly on a sheet or film that will become one of the substrates in the electrical article. For example, a nonwoven material can be formed on a copper sheet that will become one of the substrates of a capacitive or resistive article. The substrate serves as a support layer, which allows the nonwoven material to be made very thin, and because the copper sheet is never removed from the nonwoven material, problems associated with handling a fragile nonwoven material are reduced. To make the electrical article, the substrate carrying the nonwoven material may be laminated directly to another substrate having a polymer layer coated thereon. As the two substrates are laminated together in a similar manner as described above, the polymer will fill the voids in the nonwoven material, thereby forming an electrical article having a polymer/nonwoven material dielectric layer. In the finished electrical article, the nonwoven material will be in physical contact with one substrate, and may or may not be in physical contact with the other substrate, depending on the thickness of the polymer layer.

In another alternative roll-to-roll process, a nonwoven material may be formed directly on one or both of the sheets or films that will become the substrates in the electrical article then coated with a polymer composition. For example, a nonwoven material can be formed on one or both of the sheets that will become the substrates of a capacitive or resistive article. To make the electrical article, a substrate carrying the nonwoven material may be solvent-coated with a polymer solution, such as an epoxy resin solution. It is believed that the solvent solution will easily penetrate the nonwoven material and allow the polymer to fill most or all of the voids in the nonwoven material. Once the polymer solution has dried, the substrate may be laminated directly to another identical substrate (i.e., having a nonwoven material and solvent-coated polymer) or a substrate having only a polymer layer coated thereon. As the two substrates are laminated together in a similar manner as described above, the polymer will be further pressed into any open voids in the nonwoven material, thereby forming an electrical article having a polymer/nonwoven material dielectric layer. If both substrates have a nonwoven material on their surface, in the finished electrical article, a nonwoven material will be in physical contact with each substrate, and may or may not be in physical contact with the nonwoven material on the other substrate, depending on the thicknesses of the polymer layers. If only one substrate has a nonwoven material, it is most likely that the nonwoven material will only make physical contact with the substrate on which it was formed because, depending on the thickness of the polymer layer, most or all of its voids will likely be filled with polymer prior to lamination with the second polymer-coated substrate.

The laminated material is typically then heated for a sufficient time and temperature to cure the polymer composition, typically an epoxy. Exemplary curing temperatures include temperatures ranging from about 150 to about 225° C., typically about 160 to about 200° C., and exemplary curing times include a period ranging from about 90 to about 180 minutes, typically about 90 to about 120 minutes.

Adhesion of the dielectric layer to a metal substrate may be enhanced if the metal is sufficiently soft at the time of coating or becomes soft during lamination and/or cure; i.e., the foil is annealed before coating or becomes annealed during subsequent processing. Annealing may be accomplished by heating the substrate before the coating step or as a result of the curing or drying step if the metal anneal temperature is at or lower than the cure temperature of the polymer resin composition. It is preferred to use a metal substrate with an anneal temperature below the temperature at which curing occurs. Annealing condition will vary depending on the metal substrate used. Typically, in the case of copper, at either of these stages in the process, the metal substrate obtains a Vickers hardness, using a 10 g load, of less than about 75 kg/mm2. A typical temperature range of copper to achieve this hardness ranges from about 100 to about 180° C., more typically about 120 to about 160° C.

Although an electrical article of the present invention can be functional as it is fabricated, the electrical article may be patterned, for example, to form discrete islands or removed regions of material in order to limit lateral conductivity. Any suitable patterning technique known in the art may be employed. The patterned electrical article may be used as a circuit article itself or as a component in a circuit article.

A surface of the first or second substrate of the electrical article that is accessible may be contacted, for example, by an electrical trace, to make electrical contact so that the first or second substrate acts as an electrode. In addition, it may be desirable to make electrical contact with the major surface of the first or second substrate in contact with the dielectric layer or to provide a through hole contact. Through hole contacts are useful when no interaction with the electrical device is desired.

An electrical article of the present invention may further comprise one or more additional layers, for example, to prepare it for use in a printed circuit board (PCB) or flexible circuit. The additional layer may be rigid or flexible. Exemplary rigid layers include fiberglass/epoxy composite commercially available from Polyclad, Franklin, N.H., under the trade designation PCL-FR-226, ceramic, metal, or combinations thereof. Exemplary flexible layers comprise a polymer film such as polyimide or polyester, metal foils, or combinations thereof. Polyimide is commercially available from DuPont under the trade designation KAPTON and polyester is commercially available from 3M Company, St. Paul, Minn., under the trade designation SCOTCHPAR. These additional layers may also contain electrically conductive traces on top of the layer or embedded within the layer. The term "electrically conductive traces" refers to strips or patterns of a conductive material designed to carry current. Suitable materials for an electrically conductive trace comprise copper, aluminum, tin, solder, silver paste, gold, and combinations thereof.

A circuit article may be made by providing an electrical article of the present invention, patterning at least one side of the electrical article, attaching an additional layer to the patterned side of the electrical article, and providing at least one electrical contact to at least one substrate of the electrical article. Typically, the second side of the electrical article is also patterned and a second additional layer is provided and attached to this second side of the electrical article. In a preferred embodiment, a circuit article is made by providing an electrical article of the present invention, simultaneously patterning both sides of the electrical article, and subsequently attaching an additional layer to one or both sides of the electrical article.

The electrical article may be embedded or integrated in a PCB or flexible circuit. Methods for manufacturing a flexible circuit or PCB using the electrical article of the present invention are described in WO 00/45624 and are cited herein by reference.

The present invention also encompasses an electrical device comprising an electrical article of the present invention functioning in an electrical circuit of a PCB or a flexible circuit. The electrical device may include any electrical device which typically employs a PCB or flexible circuit having a capacitive component. Exemplary electrical devices include cell phones, telephones, fax machines, computers, printers, pagers, and other devices as recognized by one skilled in the art. The electrical article of the present invention is particularly useful in electrical devices in which space is at a premium or that operate at frequencies greater than 1 GHz.

EXAMPLES

This invention is illustrated by the following examples, but the particular materials and amounts thereof recited in these examples, as well as other conditions and details should not be construed to unduly limit this invention.

Materials
  Barium titanate ($BaTiO_3$): FERRO ABT-S-20 (0.7 micrometer diam.), Ferro, Cleveland, Ohio
  Chloraniline Fluorenone (CAF) Amine Curative: R-55365 Intermediate, CAS #107934-68-9, 3M Company, St. Paul, Minn.
  Dispersants: SOLSPERSE 76500, a solution of 50% active polymeric dispersant in n-butyl acetate, Lubrizol, Ltd., United Kingdom
  Solvents: Methylethylketone (MEK), Methylisobutylketone (MIBK)
  Epoxy: EPON 1001F; EPON 1050, Shell Chemical Company, Houston, Tex.
  LCP (liquid crystal polymer) nonwoven material: HM060 Type B, (Basis weight: 6.2 $g/m^2$ (gsm)), Thickness: 15 um, Tensile strength: 8.2 N/1.5 cm, Air permeability: 302 $cc/cm^2/sec$), Crane & Co., Dalton, Mass.
  Copper foil: 18 um thick (½ oz) copper foil, Oak Mitsui, Camden, S.C.

Equipment
  Milling: MiniCer lab mill from Netzsch Fine Particle Technology (Exton, Pa.)
  Mixing: Dispermat laboratory dissolvers from BYK-Gardner (Columbia, Md.)
  Peel Tester: Instron model 5567 from Instron Corporation (Canton, Mass.)
  Plasma etching: Plasmatherm PE 2480 system from Plasmatherm, Inc. (St. Petersburg, Fla.)

Test Methods
  Peel Strength Test: IPC TM-650-2.4.8: Peel Strength of Metallic Clad Laminates Example 1

Step 1: Mill 1250 grams (g) $BaTiO_3$ with 15 g SOLSPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the $BaTiO_3$ solution (made in Step 1), and 120 g MEK, to the epoxy solution from step 3, spin in the Dispermat dissolver until uniform dispersion is obtained.

Step 5: Coat a 7 um thickness of the final solution onto two pieces of copper foil Step 6: Laminate the two coated copper pieces together with the LCP nonwoven material (6.2 $g/m^2$ (gsm)) between them using a standard nip roller laminator at a temperature of 163° C. and speed of 0.9 meter/minutes.

Step 7: Conduct a final high temperature cure in air at 190° C. for 4 hours to form a capacitor laminate.

The capacitance of the capacitor laminates were measured using a standard ohmmeter and the thickness of the dielectric layer was measured after removal of Cu. The capacitive density was calculated by dividing the measured capacitance (C) by the area (A) of the sample.

Peel Strength=0.57 kg/cm
C/A=0.59 $nF/cm^2$
Dielectric thickness=20 um

Example 2

Step 1: Mill 1375 grams (g) $BaTiO_3$ (BT) with 16.5 g SOLSPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution (made in Step 1), and 120 g MEK, to the epoxy solution from step 3, spin in the Dispermat dissolver until uniform dispersion is obtained.

Step 5: Coat a 10 um thickness of the final solution onto one piece of copper foil and a 2.5 um thickness of the final solution on another piece of copper foil.

Step 6: Laminate the two coated copper pieces together with the LCP nonwoven material (6.2 gsm) between them using a standard nip roller laminator at a temperature of 166° C. and speed of 0.3 meter/minute.

Step 7: Conduct a final high temperature cure in air at 190° C. for 4 hours to form a capacitor laminate.

The capacitance of the capacitor laminates were measured using a standard ohmmeter and the thickness of the dielectric layer was measured. The capacitive density was calculated by dividing the measured capacitance (C) by the area (A) of the sample.

C/A=0.77 nF/cm$^2$

Example 3

Step 1: Mill 1500 grams (g) BaTiO$_3$ with 18 g SOL-SPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 5 um thickness of the final solution onto one piece of copper foil and a 7 um thickness of the final solution on another piece of copper.

Step 6: Laminate the two coated copper pieces together with the LCP nonwoven material (6.2 gsm) between them using a standard nip roller laminator at a temperature of 166° C. and speed of 0.3 meter/minute.

Step 7: Conduct a final high temperature cure in air at 190° C. for 4 hours to form a capacitor laminate.

The capacitance of the capacitor laminates were measured using a standard ohmmeter and the thickness of the dielectric layer was measured. The capacitive density was calculated by dividing the measured capacitance (C) by the area (A) of the sample.

C/A=0.86 nF/cm$^2$

Example 4

Step 1: Mill 1250 grams (g) BaTiO$_3$ with 15 g SOL-SPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 7 um thickness of the final solution onto two pieces of copper foil.

Step 6: Thin the LCP non-woven material (49.2 wt. % reduction) using a chemical etching process including a 45 wt. % KOH solution as etchant at an elevated temperature of 79° C. for 4 minutes, followed by washing with deionized water and drying at 120° C. for about 15 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

C/A=0.73 nF/cm$^2$

Example 5

Step 1: Mill 1375 grams (g) BaTiO$_3$ with 16.5 g SOL-SPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 10 um thickness of the final solution onto one piece of copper foil and a 2.5 um thickness of the final solution on another piece of copper foil.

Step 6: Thin the LCP non-woven material (48.1 wt. % reduction) using a chemical etching process including a 45% KOH solution as etchant at an elevated temperature of 67° C. for 9 minutes, followed by washing with deionized water and drying at 120° C. for about 15 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

C/A=1.08 nF/cm$^2$

Example 6

Step 1: Mill 1375 grams (g) BaTiO$_3$ with 16.5 g SOL-SPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 10 um thickness of the final solution onto one piece of copper foil and a 2.5 um thickness of the final solution on another piece of copper foil.

Step 6: Thin the LCP non-woven material (49.2 wt. % reduction) using a chemical etching process including a 45% KOH solution as etchant at an elevated temperature of 79° C. for 4 minutes, followed by washing with deionized water and drying at 120° C. for about 15 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

$C/A = 1.11$ $nF/cm^2$

Example 7

Step 1: Mill 1375 grams (g) $BaTiO_3$ with 1.2 wt % SOLSPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 10 um thickness of the final solution onto one piece of copper foil and a 2.5 um thickness of the final solution on another piece of copper foil.

Step 6: Thin the LCP non-woven material (51.1 wt. % reduction) using a plasma etching process including oxygen and $C_3F_8$ plasma with oxygen gas flow rate of 500 standard $cc^3/min$ (SCCM) and $C_3F_8$ gas flow rate of 100 SCCM, a pressure of 300 mTorr and RF power of 2000 Watts for 4 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

$C/A = 1.14$ $nF/cm^2$

Example 8

Step 1: Mill 1375 grams (g) $BaTiO_3$ with 16.5 g SOLSPERSE 76500 dispersant, 110 g MEK, and 164 g MIBK in the MiniCer (or LMZ-2) at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 10 um thickness of the final solution onto one piece of copper foil and a 2.5 um thickness of the final solution on another piece of copper foil.

Step 6: Thin the LCP non-woven material (38.4 wt. % reduction) using a plasma etching process including oxygen and $C_3F_8$ plasma with oxygen gas flow rate of 500 standard $cc^3/min$ (SCCM) and $C_3F_8$ gas flow rate of 100 SCCM, a pressure of 300 mTorr and RF power of 2000 Watts for 3.2 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

$C/A = 1.03$ $nF/cm^2$

Example 9

Step 1: Mill 1375 grams (g) $BaTiO_3$ with 16.5 g SOLSPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 10 um thickness of the final solution onto one piece of copper foil and a 2.5 um thickness of the final solution on another piece of copper foil.

Step 6: Thin the LCP non-woven material (29.9 wt. % reduction) using a plasma etching process including oxygen and $C_3F_8$ plasma with oxygen gas flow rate of 500 standard $cc^3/min$ (SCCM) and $C_3F_8$ gas flow rate of 100 SCCM, a pressure of 300 mTorr and RF power of 2000 Watts for 2.4 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

$C/A = 0.96$ $nF/cm^2$

Example 10

Step 1: Mill 1375 grams (g) $BaTiO_3$ with 16.5 g SOLSPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 10 um thickness of the final solution onto one piece of copper foil and a 2.5 um thickness of the final solution on another piece of copper foil.

Step 6: Thin the LCP non-woven material (20 wt. % reduction) using a plasma etching process including oxygen and $C_3F_8$ plasma with oxygen gas flow rate of 500 standard $cc^3$/min (SCCM) and $C_3F_8$ gas flow rate of 100 SCCM, a pressure of 300 mTorr and RF power of 2000 Watts for 1.6 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

C/A=0.91 nF/cm²

Example 11

Step 1: Mill 1500 grams (g) $BaTiO_3$ with 16.5 g SOL-SPERSE 76500 dispersant, 110 g MEK, and 164 g MIBK in the MiniCer (or LMZ-2) at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 5 um thickness of the final solution onto one piece of copper foil and a 7 um thickness of the final solution on another piece of copper foil.

Step 6: Thin the LCP non-woven material (30 wt. % reduction) using a plasma etching process including oxygen and $C_3F_8$ plasma with oxygen gas flow rate of 500 standard $cc^3$/min (SCCM) and $C_3F_8$ gas flow rate of 100 SCCM, a pressure of 300 mTorr and RF power of 2000 Watts for 2.4 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

C/A=1.03 nF/cm²

Example 12

Step 1: Mill 1500 grams (g) $BaTiO_3$ with 18 g SOL-SPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 5 um thickness of the final solution onto one piece of copper foil and a 7 um thickness of the final solution on another piece of copper foil.

Step 6: Thin the LCP non-woven material (20 wt. % reduction) using a plasma etching process including oxygen and $C_3F_8$ plasma with oxygen gas flow rate of 500 standard $cc^3$/min (SCCM) and $C_3F_8$ gas flow rate of 100 SCCM, a pressure of 300 mTorr and RF power of 2000 Watts for 1.6 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

C/A=0.97 nF/cm²

Example 13

Step 1: Mill 1500 grams (g) $BaTiO_3$ with 18 g SOL-SPERSE 76500 dispersant, 110 g MEK, and 164 g MIBK in the MiniCer at 4320 rpm for about 10 minutes to produce a milled dispersion.

Step 2: Add 32 g EPON 1001 F and 8 g EPON 1050 to 40 g MEK solvent, spin in the Dispermat dissolver until completely dissolved.

Step 3: Add 10 g CAF to the epoxy solution from Step 2.

Step 4: Add 240 g of the BT solution, and 120 g MEK, to the epoxy solution from step 3, spin in the Dispermat dissolver until uniform dispersion is obtained.

Step 5: Coat a 7 um thickness of the final solution onto two pieces of copper foil.

Step 6: Thin the non-woven material 30 wt. % using a plasma etching process including oxygen and $C_3F_8$ plasma with oxygen gas flow rate of 500 standard $cc^3$/min (SCCM) and $C_3F_8$ gas flow rate of 100 SCCM, a pressure of 300 mTorr and RF power of 2000 Watts for 2.4 minutes.

Step 7: Laminate the two coated copper pieces together with the nonwoven material between them using a standard nip roller laminator at a temperature of 166° C. and speed of 0.3 meter/minute.

Step 8: Conduct a final high temperature cure in air at 190° C. for 4 hours to form a capacitor laminate.

The capacitance of the capacitor laminates were measured using a standard ohmmeter. The capacitive density was calculated by dividing the measured capacitance (C) by the area (A) of the sample.

C/A=0.99 nF/cm²

Various modifications and alterations of this invention will become apparent to those skilled in the art without departing from the scope and spirit of this invention and it should be understood that this invention is not to be unduly limited to the illustrative embodiments set forth herein.

What is claimed is:

1. A method of making an electrical article comprising:
    providing two conductive substrates,
    coating a resin on a surface of each conductive substrate,
    providing an etched nonwoven material between the resin-coated surfaces of the conductive substrates, the etched nonwoven material having a desired areal density, and
    laminating the resin-coated conductive substrates and the etched nonwoven material together,
    wherein the providing an etched nonwoven material step comprises providing a first nonwoven material having a first areal density larger than the desired areal density and etching the first nonwoven material to produce the etched nonwoven material, the desired areal density being 20 percent to about 50 percent lower than the first areal density.

2. The method of claim 1 wherein the first nonwoven material is selected from the group consisting of liquid crystal polymer, nylon, polyester, polystyrene, polyacrylonitrile, polypropylene, polyvinylidene fluoride (PVDF), and hybrid materials such as poly(ether sulfone)-polyvinylidene fluoride (PES-PVDF), polyetherimide- polyvinylidene fluoride (PEI-PVDF), polyacrylonitrile- polyvinylidene fluoride (PAN-PVDF), ethylene chlorotrifluoroethylene (ECTFE), and combinations thereof.

3. The method of claim 1 wherein the etched nonwoven material is about 20 micrometers to about 0.5 micrometers thick.

4. The method of claim 1 wherein the etched nonwoven material comprises fibers having diameters of about 20 to about 500 nanometers.

5. The method of claim 1 wherein the first nonwoven material is crosslinked.

6. The method of claim 1, wherein etching the first nonwoven material to produce the etched nonwoven material comprises etching the first nonwoven material in an aqueous etching solution comprising an alkali metal salt and an alkanolamine solubilizer.

7. The method of claim 6, wherein the first nonwoven material comprises a polyimide copolymer comprising carboxylic ester units in a polymeric backbone of the polyimide copolymer.

8. The method of claim 1, wherein etching the first nonwoven material to produce the etched nonwoven material comprises plasma etching with an oxygen and $C_3F_8$ plasma.

9. A method of making an electrical article comprising:
   coating a resin layer on a surface of a first conductive substrate,
   forming an etched nonwoven material on a surface of a second conductive substrate, the etched nonwoven material having a desired areal density, and
   laminating the conductive substrates together with the resin layer and the etched nonwoven material facing each other,
   wherein the forming an etched nonwoven material step comprises providing a first nonwoven material having a first areal density larger than the desired areal density and etching the first nonwoven material to produce the etched nonwoven material, the desired areal density being 20 percent to about 50 percent lower than the first areal density.

10. The method of claim 9 wherein the etched nonwoven material is about 20 micrometers to about 0.5 micrometers thick.

11. The method of claim 9 wherein the etched nonwoven material comprises fibers having diameters of about 20 to about 500 nanometers.

12. A method of making an electrical article comprising:
   forming an etched nonwoven material on a first surface of one or both of a first and second conductive substrate, the etched nonwoven material having a desired areal density;
   coating a resin layer on the first surfaces of both conductive substrates, and
   laminating the conductive substrates together with the resin-coated first surfaces facing each other,
   wherein the forming an etched nonwoven material step comprises providing a first nonwoven material having a first areal density larger than the desired areal density and etching the first nonwoven material to produce the etched nonwoven material, the desired areal density being 20 percent to about 50 percent lower than the first areal density.

13. The method of claim 12 wherein the etched nonwoven material is about 20 micrometers to about 0.5 micrometers thick.

14. The method of claim 12 wherein the etched nonwoven material comprises fibers having diameters of about 20 to about 500 nanometers.

* * * * *